No. 800,321. PATENTED SEPT. 26, 1905.
M. P. OSBOURN.
VALVE DEVICE FOR STEAM HEATING APPARATUS.
APPLICATION FILED OCT. 29, 1903.
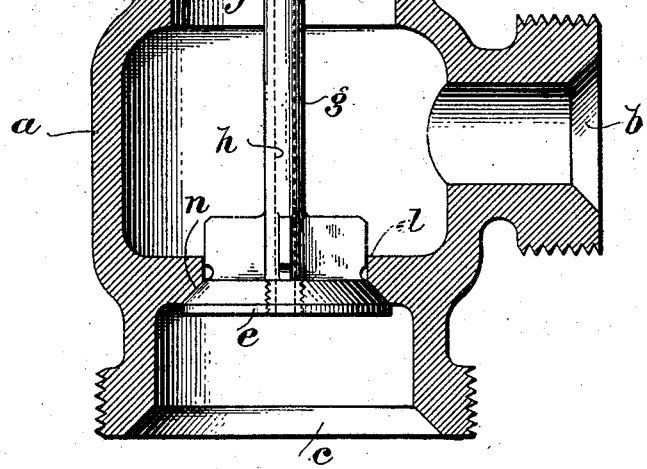

UNITED STATES PATENT OFFICE.

MILLARD P. OSBOURN, OF MERCHANTVILLE, NEW JERSEY, ASSIGNOR TO WARREN WEBSTER AND COMPANY, A CORPORATION OF NEW JERSEY.

VALVE DEVICE FOR STEAM-HEATING APPARATUS.

No. 800,321. Specification of Letters Patent. Patented Sept. 26, 1905.

Application filed October 29, 1903. Serial No. 179,008.

*To all whom it may concern:*

Be it known that I, MILLARD P. OSBOURN, of Merchantville, county of Camden, and State of New Jersey, have invented an Improvement in Valve Devices for Steam-Heating Apparatus, of which the following is a specification.

More particularly, my invention relates to that class of automatic outlet-valves for steam-heating systems in which the valve-piece is controlled by a pressure-motor controlled by the differential pressure in the inlet and outlet. Such devices are especially adapted for use in systems of steam-heating in which a partial vacuum or lower pressure is created in the returns or outlets by suitable vacuum-creating devices; but as heretofore constructed they have been arranged to open the valve-piece to allow the water of condensation to escape on the creation of the desired differential, and in some forms the creation of such differential has been controlled by devices controlled by the accumulation of water of condensation on the inlet side.

Owing to difficulty in maintaining substantially uniform pressures at the inlets and outlets of the valves of differently-located radiators it has been difficult to produce a uniform differential acting on the pressure-motors of the different valves, and uniformity of action has been difficult of attainment.

My present improvement consists in so arranging the motor with reference to the valve that the differential created by the suction or lower pressure at the outlet acts to close the valve instead of opening it, and the valve which is outwardly opening is opened by the weight of the water in the valve-body when it is sufficient to counteract the differential.

In order to obtain uniformity in the operation of the valves, notwithstanding variations in the differential acting on the motor, I employ an adjustable spring acting in aid of the motor to close the valve. By adjusting the tension of this spring the effective tension on the valve-piece may be regulated to compensate for variations in the differential acting on the motor.

In speaking of a pressure-motor it is to be understood that it may be either of the piston type, as shown in the drawings, or of the equivalent diaphragm form.

In the drawings, Figure 1 is a vertical sectional view of my improved automatic valve device, and Fig. 2 is a horizontal sectional view of the same on the line A A of Fig. 1.

$a$ is the valve-body, having the usual inlet $b$ and outlet $c$ with a thoroughfare $d$, controlled by the valve-piece $e$. The valve-piece $e$ is connected with a pressure-motor $f$, shown as a piston in the upper part of the valve-body, by a hollow stem $g$, having a passage-way $h$, opening through the valve-piece into the outlet $c$ and through the motor $f$ into the low-pressure or suction chamber $i$ above the piston. $j$ is a vent in the piston forming a communication between the low-pressure or suction chamber $i$ and the interior of the valve-body in communication with the inlet $b$. This vent $j$ is of smaller area than the passage-way $h$ in the stem $g$, so that a lower pressure will be maintained in the suction-chamber $i$ than exists in the body of the valve communicating with the inlet.

$k$ is a cap or bonnet closing the upper part of the valve-body and forming the top of the low-pressure or suction chamber $i$. This cap or bonnet is provided with an internally-threaded nipple $s$, in which is an adjustable screw-plug $o$, connected by a spring $m$ with the pressure-motor.

The valve-seat $n$ is formed on the under side of the thoroughfare $d$, and the valve-piece $e$ is arranged below and closes by upward movement, so that the spring $m$ acts to lift the valve-piece and hold it normally closed. As the pressure in the chamber $i$ is lower than the pressure acting on the lower side of the piston, this differential also acts to raise the valve-piece and hold it closed. The valve-piece is thus closed by the combined action of the differential pressure acting on the piston and the tension of the spring, and as the tension of the spring may be regulated by the adjustment of the screw-plug $o$ a uniform effective tension on the valve-piece may be maintained, notwithstanding variations in the differential. This is an important feature in vacuum systems, or systems in which a lower pressure or partial vacuum is produced in the returns communicating with the outlets of the valves, where by reason of the different location of the radiators and their valves with respect to the exhausting devices as well as the source of supply it is not possible to maintain the same degree of suction or low pressure at each valve or the same steam-pressure in the radiator. Consequently the same differential pressure cannot be maintained on the motors of all valves. The adjustment of the spring $m$ compensates for this variation in the differential pressure and enables a substantially uniform effective tension to be maintained on each valve wherever located.

The operation of the device is as follows: The air is drawn out of the radiator through the vent $j$, chamber $i$, and passage-way $h$ into the outlet $c$. When water of condensation collects in sufficient volume in the body $a$ to overcome by its weight the upward tension on the valve-piece $e$, it will open the valve-piece and pass into the outlet, and the valve-piece will again close in its seat.

What I claim as new, and desire to secure by Letters Patent, is as follows:

1. In a valve device, the combination of a valve-body having an inlet and an outlet and a thoroughfare, a pressure-motor in said valve-body having one side in communication with the inlet side and the other side in communication with a low-pressure chamber in which a lower pressure is maintained than on the inlet side, a valve-piece to control the thoroughfare arranged to be normally closed by the differential pressure on the pressure-motor, and a spring acting in aid of the pressure-motor to close said valve.

2. In a valve device, the combination of a valve-body having an inlet and an outlet and a thoroughfare, a pressure-motor in said valve-body having one side in communication with the inlet side and the other side in communication with a low-pressure chamber in which a lower pressure is maintained than on the inlet side, a valve-piece to control the thoroughfare arranged to be normally closed by the differential pressure on the pressure-motor, a spring acting in aid of the pressure-motor to close said valve, and means to adjust the tension of said spring to regulate the effective tension acting to close said valve-piece.

3. In a valve device, the combination of a valve-body having an inlet and an outlet and a thoroughfare, a pressure-motor in said valve-body having one side in communication with the inlet side and the other side in communication with a low-pressure chamber in which a lower pressure is maintained than on the inlet side, said pressure-motor having a vent between the inlet side of the valve-body and the low-pressure chamber for the escape of air, a valve-piece to control the thoroughfare arranged to be normally closed by the differential pressure on the pressure-motor, and a spring acting in aid of the pressure-motor to close said valve.

4. In a valve device, the combination of a valve-body having an inlet and an outlet and a thoroughfare, a pressure-motor in said valve-body having one side in communication with the inlet side and the other side in communication with a low-pressure chamber in which a lower pressure is maintained than on the inlet side, a valve-piece to control the thoroughfare arranged to be normally closed by the differential pressure on the pressure-motor, and a spring acting in aid of the pressure-motor to close said valve, said valve device having a communication between the inlet side of the valve-body and the low-pressure chamber for the escape of air.

5. In a valve device, the combination of an outwardly-opening valve-piece, a pressure-motor controlled by the differential pressure on the inlet and outlet sides acting on said valve-piece to close it and a spring acting on said pressure-motor in aid of the differential to close said valve-piece.

6. In a valve device, the combination of an outwardly-opening valve-piece, a pressure-motor controlled by the differential pressure on the inlet and outlet sides acting on said valve-piece to close it and a spring acting on said pressure-motor in aid of the differential to close said valve-piece, and means to adjust the tension of said spring and the effective tension on the valve-piece.

7. A valve device consisting of a valve-body having an inlet and an outlet and a thoroughfare, a pressure-motor in the upper part of said valve-body, an outwardly-opening valve-piece to control the thoroughfare, a hollow stem connecting said valve-piece with the pressure-motor and having a passage-way between the outlet and the upper side of the pressure-motor, and a spring acting in aid of the pressure-motor to close the valve-piece on the seat.

8. A valve device consisting of a valve-body having an inlet and an outlet and a thoroughfare, a pressure-motor in the upper part of said valve-body provided with a vent, an outwardly-opening valve-piece to control the thoroughfare, a hollow stem connecting said valve-piece with the pressure-motor and having a passage-way between the outlet and the upper side of the pressure-motor, and a spring acting in aid of the pressure-motor to close the valve-piece on its seat.

9. A valve device consisting of a valve-body having an inlet and an outlet and a thoroughfare, a pressure-motor in the upper part of said valve-body having a vent, a bonnet closing the upper part of the valve-body and forming a chamber above the motor, said bonnet being provided with an internally-threaded nipple, an adjustable threaded plug in said nipple, a spring connecting said plug and motor and acting to lift the motor, an outwardly-opening valve-piece to control the thoroughfare, and a hollow stem between the valve-piece and pressure-motor forming a passage-way between the outlet and the chamber above the motor.

10. In a valve device, the combination of an outwardly-opening valve-piece, and a pressure-motor controlled by the differential pressures on the inlet and outlet sides acting on said valve-piece to close it, the valve-piece being opened against the action of said pressure-motor by the weight of the water acting upon it.

In testimony of which invention I hereunto set my hand.

MILLARD P. OSBOURN.

Witnesses:
ERNEST HOWARD HUNTER,
R. M. KELLY.